Figure 1:
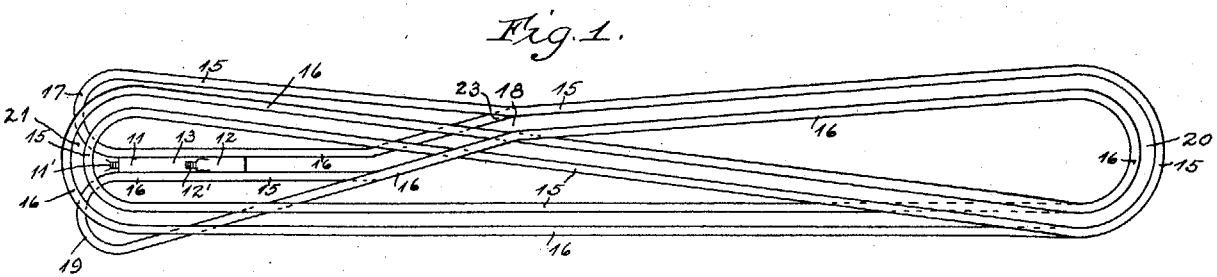

J. A. MILLER.

PLEASURE RAILWAY STRUCTURE.

APPLICATION FILED MAY 19, 1913.

Reissued July 1, 1913.

13,588.

2 SHEETS—SHEET 1.

Witnesses,
C. J. Schmidt
Lucline Bullwinkel.

Inventor,
John A. Miller
By Offield, Towle, Graves & Offield
Att'ys.

COLUMBIA PLANOGRAPH CO., WASHINGTON, D. C.

J. A. MILLER.
PLEASURE RAILWAY STRUCTURE.
APPLICATION FILED MAY 19, 1913.
Reissued July 1, 1913.
13,588.
2 SHEETS—SHEET 2.
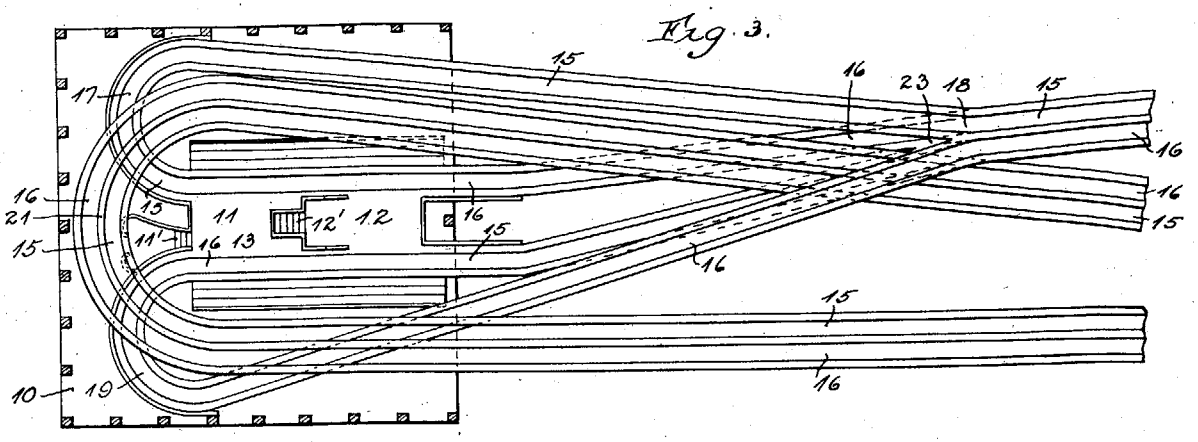
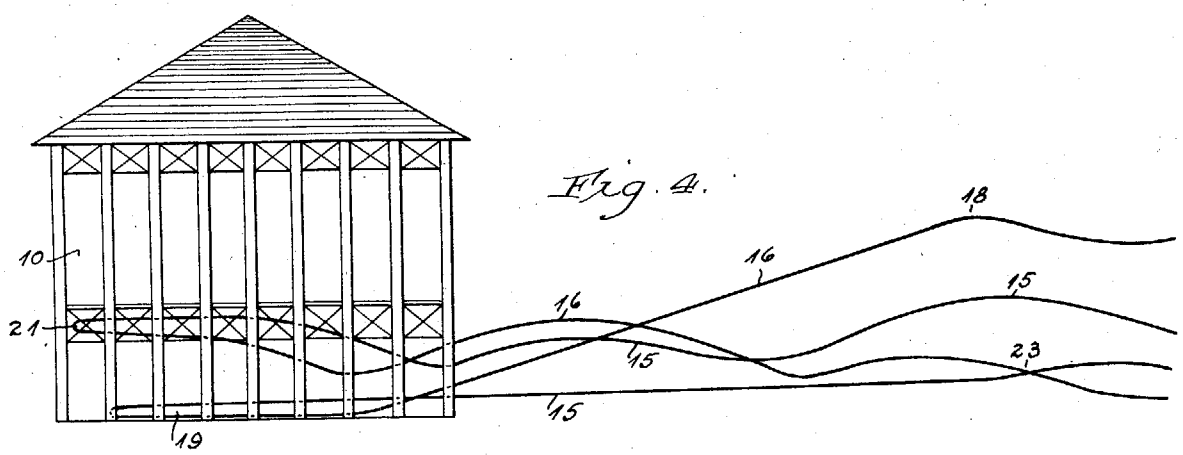
Witnesses:
C. J. Schmitt.
Adeline Bullwinkel.
Inventor,
John A. Miller
By Offield, Towle, Graves & Offield
Attys.

UNITED STATES PATENT OFFICE.

JOHN A. MILLER, OF HOMEWOOD, ILLINOIS.

PLEASURE-RAILWAY STRUCTURE.

13,588. Specification of Reissued Letters Patent. Reissued July 1, 1913.

Original No. 937,456, dated October 19, 1909, Serial No. 492,033. Application for reissue filed May 19, 1913. Serial No. 768,690.

*To all whom it may concern:*

Be it known that I, JOHN A. MILLER, of Homewood, in the county of Cook and State of Illinois, have invented certain new and useful Improvements in Pleasure-Railway Structures, of which the following is a specification.

My invention relates to pleasure railways and similar amusement apparatus of the type popularly known as "roller coasters" or "scenic railways."

As usually constructed such apparatus is provided with a narrow gage railway track, having a steep ascending grade from near the starting point or station until a considerable elevation is reached, from which elevation the track proceeds with various curves, or loops, and with a succession of ascending and descending grades or dips, the highest point of elevation of each succeeding grade being lower than the highest point of the next preceding one, and this continues until the track reaches its lowest level and returns to the starting point or loading station. The earlier structures involved only a single track, but in later structures double track was used so that there were two courses. In some of these structures, as for example in Thompson Patent No. 470,220, March 8, 1892, the courses were connected together for serial travel, *i. e.*, the incoming end of one course was connected at the starting station with the beginning of the other course, a car starting on and traversing over one course back to the station and then entering and traversing over the other course and back to the station on the same track from which it originally started. This arrangement enabled the positioning of loading and unloading platform sections adjacent the one track so that loading and unloading could be accomplished on the one track without the necessity of crossing over to the other track. In later structures provision was made so that two cars could be started simultaneously on the two tracks or courses so that the cars would travel together in the same general direction to give the effect of racing, and to enable loading and unloading on one track in order to eliminate dangerous crossing of the tracks by passengers and attendants, the courses were arranged with the end of one connected with the beginning of the other as in Thompson patent referred to. In such arrangement the tracks looped and diverged, or crossed each other, but such looping or crossing destroyed more or less the racing effect, the cars not continuing side by side throughout the entire run. Also in double track structures the inner curves are shorter and steeper than the outer curves which will give advantage to the cars on the outer curves unless compensation is made. Such compensation was accomplished by crossing the tracks one or more times so that a car running over the inner track of one curve would take the outer track on another curve, thus equalizing the length of the courses and giving the cars equal chances. However, such crossings, as before described, will detract from the effects of the race by destroying the continuous side by side travel of the cars over the entire run.

My invention has, therefore, for one of the main objects the provision of a railway with a plurality of courses of substantially equal length and containing a number of curves and loops, and arranged in such manner that cars or trains, if started simultaneously on the various courses from a starting point will travel parallelly and side by side throughout the entire extent of the courses without crossing each other.

Another object is to provide such arrangement that a car or train after traversing one course will finish on a track section leading to the starting point and connecting with the outgoing end of another course.

Another object is to provide a common narrow platform having a loading and unloading section and situated between the incoming ends of the courses whereby the cars will substantially maintain their parallel relation until they are stopped at the platform and so that passengers can be loaded and unloaded at either course without having to cross any tracks. The incoming ends of the courses continue from the unloading section of the platform past the loading section and then connect with the courses at the high starting point, the incoming end of the one course connecting with the high starting point of the other course.

Another object of the invention is to provide for such connection of the incoming ends of the courses with the starting ends without crossing, and this is accomplished by curving the incoming ends in opposite directions away from the loading station and then converging them to connect with the starting ends of the courses, suitable means being provided for propelling the cars up the steep incline to the starting point.

Figure 2:
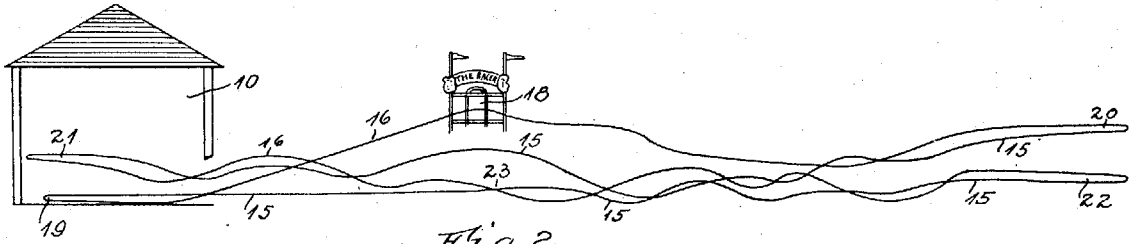

In the accompanying drawings which illustrate the various features of construction and operation Figure 1 is a diagrammatical plan view of the courses and the loading and unloading points; Fig. 2 is a more or less diagrammatic side elevation illustrating the pavilion and the high starting point, and the various curves and grades of the courses; Fig. 3 is an enlarged plan view of the starting end of the railway and showing the roof removed from the starting pavilion, and Fig. 4 is a side view of the parts shown in Fig. 3.

Referring to the drawings, 10 designates a pavilion provided with a passenger platform 13 having the loading section 11 and the unloading section 12. Leading to the section 11 is an entrance stairway 11′ and leading from the section 12 is an exit stairway 12′. In practice the loading and unloading platform sections are separated so that passengers cannot pass directly from one to the other, and confusion is thus prevented and safety assured. Referring to the track arrangement, the course 15 begins adjacent the loading platform section and curves to the right as indicated at 17 and then inclines upwardly to the starting point 18. The other course 16 starts adjacent the opposite side of the loading platform section and curves to the left as indicated at 19, and then inclines upwardly to the starting point 18. At the starting point the courses are close together and maintain such relative lateral position throughout the entire run and up to the unloading platform section. Starting with the point 18 the courses extend away from the pavilion in substantially the opposite direction from which they start therefrom until the curve 20 is reached, the course 15 being on the outside of this curve and the course 16 on the inside thereof. The courses then cross in a diagonal line to the curve 21 mounted on suitable supports in the pavilion but above the platforms as indicated. On this curve the course 15 is on the inside and the course 16 on the outside, the courses then extending straight and taking the curve 22 below the curve 20, the course 15 still being on the inside and the course 16 on the outside. The courses then continue to the point substantially below the starting point and then back to the platform at opposite sides of the unloading section thereof, the unloading end of the course 15 connecting with the loading end of the course 16 and the unloading end of the course 16 connecting with the loading end of course 15. The platform 13 is narrow so that the two courses substantially maintain their relative lateral spacing as shown in Fig. 1, or diverge slightly as indicated in Fig. 3. The courses, however, do not at any point cross each other.

In practice cars of any suitable type may be used, and it is desirable that they be so balanced as to run at approximately the same speed, the track being arranged as described so that each course is of substantially the same length. The object is to have the cars and track so adjusted that two cars, traveling simultaneously over the two courses and without a load, will move at substantially the same speed and finish at approximately the same time. Thus the speed of each car, from the time it is allowed to move forward by gravity, will depend upon its momentum and load, and the resistance presented by the load and otherwise encountered in the forward travel of the car, and in consequence thereof the velocity and speed of the cars are increased or decreased accordingly. As constructed the empty cars should pass over the track and to the station approximately in the same time, but owing to the variations in the loads, and in the resistances presented and encountered by them, one or the other is almost sure to excel in speed. In consequence of the variations in the lengths of corresponding portions of the tracks, dependent upon whether they are on the inside or outside of the various curves, and the variations in speed of the cars when operated by gravity, the cars, from time to time, and as often as they pass around the various curves, may shift their relative positions so that during the entire course one car is likely to vary in its position and be ahead of or behind the other car as many as four or more times, depending, of course, on the length of the track and the number of curves; or it is possible under some conditions, that one of the cars, owing to its momentum, and the resistances presented and encountered by it, may precede the other car throughout the entire course. However, the cars never cross each other's paths and are always close together within sight of each other and never far enough apart to cause loss of excitement or interest in the race.

The passengers entering the loading platform 11 by the stairway 11′ are loaded on to the cars at opposite sides of the platform and these cars are then conveyed by suitable mechanism, preferably the usual sprocket chains, up the inclines to the starting point 18 where they are started simultaneously on their downward travel and will take successively the curves 20, 21 and 22 and will reach the point 23 below the starting point and from there will move to the opposite sides of the unloading platform section, each car, however, terminating its run on that side of the platform opposite to the side from which it started, the car ending on course 15 being then ready to be moved along to course 16 adjacent the loading platform section and the car ending on course 16 being ready to be moved along to the course 15 adjacent the loading platform section. The same passengers can remain in the cars to take the other course of the railway or can change cars, or the passengers can all unload at the unloading platform section and the empty cars then moved forwardly to the loading platform section to receive other passengers. Thus the arrangement excites considerable racing spirit and excitement while at the same time perfect safety is assured as passengers or attendants are at no time required to cross any tracks when entering the loading platform section or when changing cars, and they will not interfere with each other. Throughout the entire run from the starting point to the unloading platform section, the cars or tracks remain close together and side by side. Although in Fig. 3 the incoming ends of the courses separate slightly in order to accommodate the platform, such diversion is not sufficient to in any way disturb the excitement of the finish of a race. The inclines from the loading platform section to the starting point extend below the curve 21 and the diagonal sections of the courses pass between the incline to the course 16 and the finishing ends of the course. Additional excitement is thus afforded as the cars pass at one part of the course over or below cars at other points of the course.

While I have described my improved arrangement as particularly adapted for a simultaneous operation of a plurality of cars, it is obvious that a single car or a train of cars may be run over the same course without at any time having a car operated over the other course. Neither do I desire to be limited to the precise construction and arrangement shown and described as changes and modifications might be made which would still come within the scope of the invention.

I claim the following:

1. An amusement apparatus of the character described comprising a gravity railway, part of which railway crosses another part thereof between the high starting point and the low finish point on the figure-eight plan, said railway comprising two courses extending alongside of each other without interruption from start to finish of the railway so that cars on the respective courses will always have the same sides opposed to each other.

2. A gravity railway of the character described comprising two tracks of substantially equal length arranged to run alongside of each other and without crossing each other throughout their entire extent from the high or starting end to the low or finish end, and inclines each connecting the finish end of one track with the starting end of the other track, said inclines not crossing each other.

3. An amusement apparatus of the character described including one continuous track arranged in two ascending and two descending courses, the two descending courses extending side by side without interruption of such side-by-side arrangement throughout all their length.

4. An amusement apparatus of the character described provided with a continuous track arranged in two ascending and two descending courses, the two descending courses extending side by side throughout and at the lower point extending in a direction the reverse of their direction at the high point, and the two ascending courses rising in opposite curves to the high point and each ascending course connecting the low point of one descending course with the high point of the other.

5. A gravity railway of the character described provided with a continuous track arranged to provide two courses arranged alongside of each other throughout their extent from a high starting point to the low finish point so that cars on the courses will always have the same side opposed to each other from start to finish, the finishing end of each course connecting with the starting point of the other course.

6. A gravity railway of the character described provided with a continuous track arranged to provide two courses arranged alongside of each other throughout their extent from a high starting point to the low finish point so that cars on the courses will always have the same side opposed to each other from start to finish, the finishing end of each course connecting with the starting point of the other course, and a common passenger platform situated between their side by side finishing ends.

7. A pleasure railway comprising two tracks extending side by side from a high starting point to the low finish point, inclines connecting the finish ends of the tracks with the starting ends thereof at the high starting point, a passenger platform located between the finish ends of the tracks, said inclines diverging from each other after leaving the finish ends of the tracks to leave entrance passageway to the platform whereby said platform may be reached by passengers without crossing of tracks.

In witness whereof, I hereunto subscribe my name, this 14 day of May, A. D. 1913.

JOHN A. MILLER.

Witnesses:
ISAAC H. LEVY,
FRANK GOMAN.

Copies of this patent may be obtained for five cents each, by addressing the "Commissioner of Patents, Washington, D. C."